No. 847,058. PATENTED MAR. 12, 1907.

G. GAILLARD.
OPTICAL DEVICE FOR USE WITH MEASURING INSTRUMENTS.
APPLICATION FILED MAY 26, 1906.

3 SHEETS—SHEET 1.

Witnesses

Inventor
Gaston Gaillard
By

THE NORRIS PETERS CO., WASHINGTON, D. C.

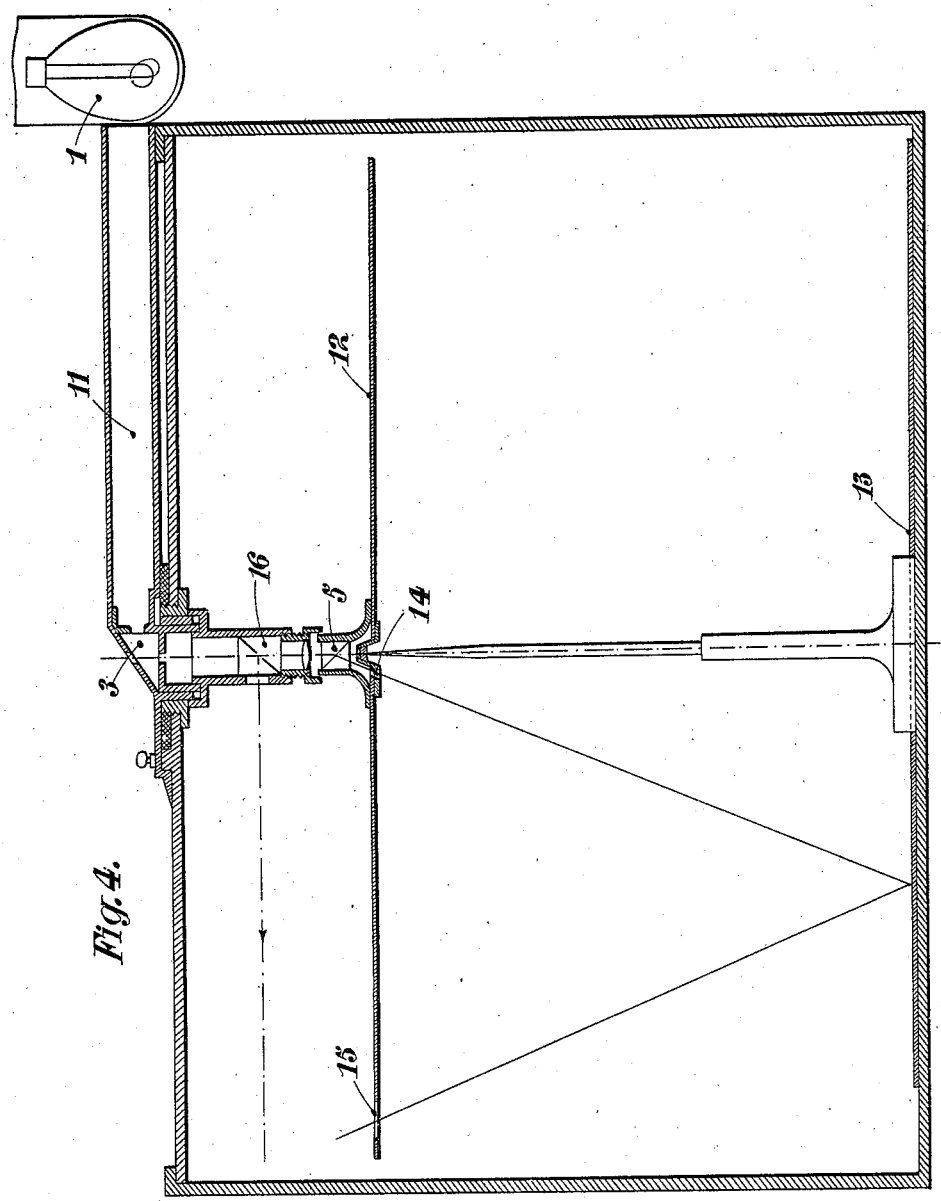

No. 847,058. PATENTED MAR. 12, 1907.
G. GAILLARD.
OPTICAL DEVICE FOR USE WITH MEASURING INSTRUMENTS.
APPLICATION FILED MAY 26, 1906.
3 SHEETS—SHEET 3.
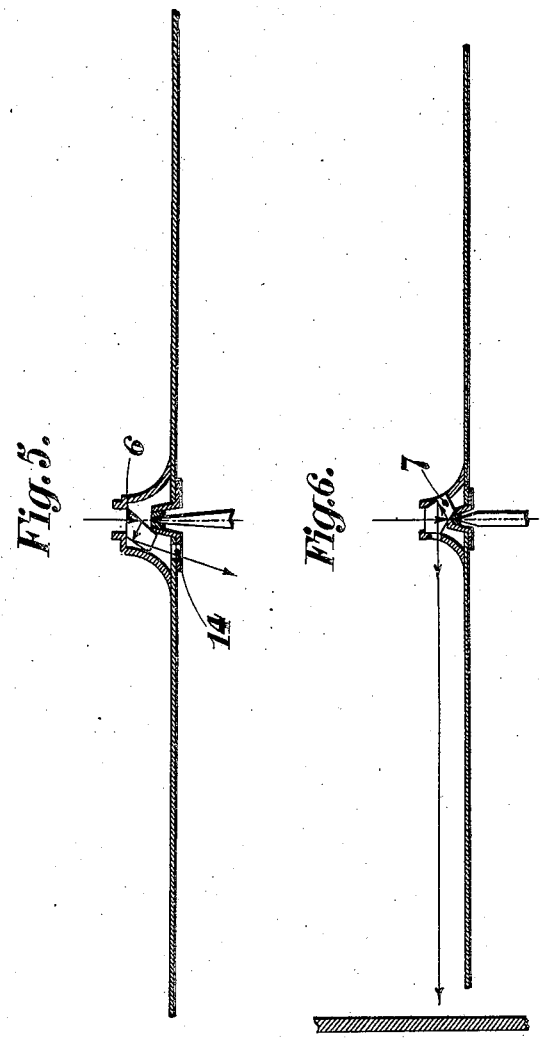
Witnesses:
Inventor
Gaston Gaillard
By
James L. Norris,
Atty.

UNITED STATES PATENT OFFICE.

GASTON GAILLARD, OF PARIS, FRANCE.

OPTICAL DEVICE FOR USE WITH MEASURING INSTRUMENTS.

No. 847,058.  Specification of Letters Patent.  Patented March 12, 1907.

Application filed May 26, 1906. Serial No. 318,905.

*To all whom it may concern:*

Be it known that I, GASTON GAILLARD, engineer, a citizen of the French Republic, residing at Paris, France, have invented certain new and useful Improvements in Optical Devices for Use with Measuring Instruments, of which the following is a specification.

This invention relates to an optical device for use in connection with measuring and registering appliances wherein indications are furnished by the amplification of a displacement or are translated by the measurement of an angle; and the object thereof is to provide an optical device in a manner as hereinafter set forth which will permit of either photographically recording or merely reading in a convenient and quick manner the indications of the instrument to which the optical device is applied. It may likewise be combined with a mechanical system—for example, with a lever and a hand moving over a dial—so as to illuminate solely the part of the dial upon which the point of the hand is projected.

In registering appliances of great sensitiveness this arrangement is very advantageous, because it substitutes for the displacements of a stylus controlled by a lever giving rise to numerous frictions the displacement of a luminous point which is registered on ferroprussiate paper or on some other photographic paper in accordance with the degree of rapidity of the variations to be observed.

Figure 1:
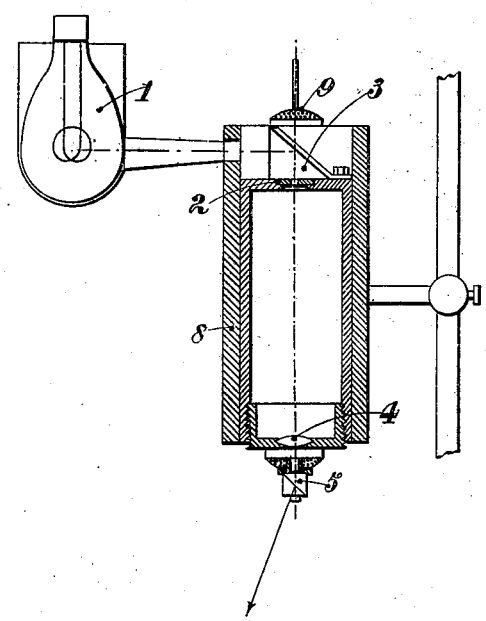
Figure 2:
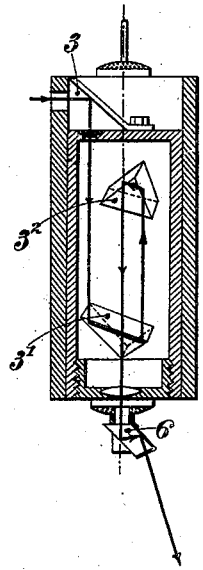
Figure 3:
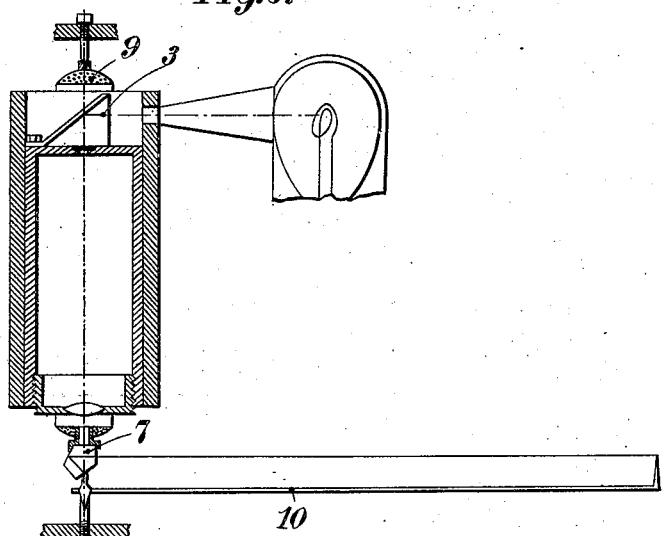
Figure 3:
Figure 3:
Figure 3:
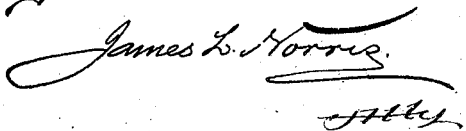

In the accompanying drawing, Figures 1 and 2 illustrate in section two constructional forms of the device applied to galvanometers and permitting either of direct reading or the recording of the indications of the apparatus. Fig. 3 shows the device applied to a galvanometer, voltmeter, or ampere-meter, the movable system of which comprises a hand moving in front of a dial. The optical system illuminates only that part of the dial upon which the hand is projected, but, on the other hand, does not in any way obstruct the simultaneous illumination of the dial itself. Figs. 4, 5, and 6 show the application of the device to a marine compass.

In principle the device comprises a source of light 1, a diaphragm 2, a total-reflection prism or a complete system of prisms, according to the length of focus required, an objective 4 serving to furnish the image of a luminous point, and, if necessary, a complete system of lenses for insuring the complete utilization of the pencil or rays. The whole of this assemblage is fixed. In front of the objective there moves a double refractor carried by the displaceable portion of the apparatus the deviations of which are to be studied.

The luminous rays emerging from the prism 3 and coming to the double refractor 5 coincide with the axis of rotation of the latter. If it falls at an angle of ninety degrees on the double refractor, the ordinary ray is not deviated. If it falls at another angle, which is obtained by modifying the inclination of the incidence-surface of the crystal, there is obtained two emerging rays which are both deviated. In the first case the ordinary ray can be obliterated—for example, by means of blackening the point of emergence of the ordinary ray, as is done in apparatus which utilize double-refractor prisms.

The double refractor may be replaced by a compound prism likewise giving a deviated image like that as shown at 6 in Fig. 2 or by a double-reflection right-angled prism, as represented at 7 in Fig. 3, or also in certain cases a mirror.

For galvanometers, Fig. 1, 2, and 3, the optical system intended for furnishing the luminous image in the axis of the apparatus is placed in the part 8, of soft iron, arranged within the frame 9. The double refractor, the prism, or the mirror is mounted upon the system 9. The luminous rays emitted by the source of light 1 are reflected by the prism 3 and leave the apparatus through the objective 4 along the axis of rotation of this apparatus. They are received upon the double refractor 5 or upon one of the prisms 6 7. The deviated image is received either directly upon a graduated dial, permitting of direct reading of the angles and not of the tangents of these angles, as in the mirror method, or upon a mirror which reflects the image onto an upper movable screen, which permits of obtaining a greater interval in accordance with the conditions of recording or the dimensions of the apparatus. With the prism 6 the reading takes place in the same manner. In the example represented in Fig. 2 in order to obtain a focus of greater length a system of prisms 3 3' 3² is added to the prism 3.

Finally, in the example represented in Fig. 3 the system 9 carries a hand 10. The prism 7, likewise carried by the displaceable system, deviates the luminous ray in such a manner as to illuminate the point of the hand or a hole formed at its center. With this arrangement the person who wishes to take the reading cannot be blinded by the source of light that illuminates the dial. This arrangement is likewise applicable to volt-meters and to ampere-meters. In this case the right-angled double-reflection prism or the mirror or simple total-reflection prism 7 permits of applying it very readily to circular scale profile appliances. This device would at first sight appear to be most readily applied to movable dial apparatus; but it is equally well applicable to thermic and electromagnetic apparatus based upon the direct action of a solenoid upon an extremely thin sheet of metal, or upon the attraction of two unequally-charged pole-pieces and to those with rotary field, &c. As before, the double refractor or the prism only is displaced by the movable system of the apparatus and all the rest of the apparatus remains fixed.

The device may also be advantageously utilized in the greater number of electrical appliances, such as hysteresis meters, &c. It may also be utilized in general in all measuring instruments, thermometers, pyrometers, manometers, wattmeters, indicators, annunciators, alarms, and meters of all kinds, clocks, engine-room and other indicators for ships, &c.

The device may also be used for the night-reading of the navigating-compass and the recording of any other magnetic apparatus.

Fig. 4 shows one of the possible arrangements in this case for the application of the principle of this device. Figs. 5 and 6 represent modifications.

The light from the source 1 is directed into a tube 11, moving over the upper glass of the compass and centered upon it in such a manner that it may be rotated at will. The tube may likewise be arranged inside, or the light may be directed merely through an orifice situated upon one side of the trough. A mirror is carried by the rose 12. A mirror 13, placed in the bottom of the apparatus, receives the deviated luminous rays directed by the double refractor, the prism, or the mirror through an opening 14, formed in the rose, and directs these rays onto a transparent part 15, formed in the periphery of the rose and corresponding to the north. In place of this arrangement a double-reflection prism 7 might be employed, Fig. 6, directing the ray corresponding to the north directly parallel with the rose. The mirror 13 is thus dispensed with. In front of the objective a double total-reflection prism or a mirror mounted independently and directed along the axis of the vessel, while nevertheless permitting of the passage of the central ray, directs a luminous ray along the line of the longitudinal axis of the vessel, so that it is impossible to have one luminous point at the north and another illuminating precisely the line with which a given rhumb must be caused to correspond or in front of which such a graduation should be brought.

The device may be provided with an improvement whereby it is possible by means of an external index or of the light-tube itself to modify the position of the prism 16 or of the mirror. For example, in the case in which it is desired to steer in making an angle of fifteen degrees to the east with the north the prism 16, which in its initial position directed the luminous ray along the longitudinal axis of the boat, is rotated through an angle of fifteen degrees in a contra-clockwise direction. In this manner by causing the luminous point given by the prism 16 or the mirror to coincide with the luminous point indicating the north the desired course will be obtained. Finally, this prism or this mirror may be rendered solid with the rose by mounting it upon the double refractor or the compound prism itself. If, therefore, this upper prism is displaced by means of an index through the angle required for steering relatively to the image of the double refractor or of the compound prism fixed on the north and this by momentarily lifting the rose by means of an external device similar to that for balances, for example, in such a case it only remains to bring this second image onto the longitudinal axis of the vessel in order to make the desired course.

It is obvious that without any modification of the principle the device may be applied to a large number of measuring instruments besides those mentioned above.

Having thus described and ascertained the nature of my invention and in what manner the same may be performed, I declare that what I claim is—

1. An optical device for measuring instruments to enable the reading of the indications of the instrument comprising a fixed optical system embodying a luminous source, a diaphragm, a refractor, and an objective and a movable optical system for receiving the rays emitted by the fixed optical system and embodying a refractor for directing the luminous rays toward a scale or screen.

2. An optical device for measuring instruments to enable the reading of the indications of the instrument comprising means for directing the luminous rays along the axis of rotation of the movable parts of the instrument, and means for directing said rays toward the scale of the instrument or a screen.

In testimony whereof I have hereunto set my hand in presence of two subscribing witnesses.

GASTON GAILLARD.

Witnesses:
 EMILE KLOTZ,
 MAS DE RIVAUD.